United States Patent Office 2,837,558
Patented June 3, 1958

2,837,558

ESTERS OF N,N-BIS(2-CYANOETHYL) CARBOXAMIC ACIDS

John W. Lynn, Charleston, W. Va., assignor to Union Carbide Corporation, a corporation of New York No Drawing. Original application April 22, 1953, Serial No. 350,514, now Patent No. 2,790,820, dated April 30, 1957. Divided and this application June 5, 1956, Serial No. 589,387

1 Claim. (Cl. 260—465.4)

This invention relates to a new class of organic compounds. More particularly, this invention relates to the esters of N,N-bis(2-cyanoethyl) carboxamic acids which are useful as plasticizers.

Since polyvinyl resins are generally too hard and rigid to be used for many purposes without a plasticizer, it is usually necessary to add a plasticizer to make the resins soft, pliable and capable of being milled into strong, pliable sheets or films. It is also advantageous that the plasticized resin compositions have heat stability, suppleness and elasticity. In order for a material to be useful as a plasticizer, it is necessary that it be compatible with the resin and not exude or sweat out, leaving the resin unplasticized. Therefore, it is an object of my invention to provide compounds of the class described above which are improved plasticizers for polyvinyl resins.

The compounds of my invention are useful in plasticizing vinyl resins, including, for example, the vinyl chloride-vinyl acetate resins, the vinyl chloride resins, the vinyl chloride-vinyl acetate-maleic acid resins, the vinyl chloride-acrylonitrile-vinyl acetate resins, and the vinyl chloride-acrylonitrile resins. More particularly, the compounds comprising my invention are useful in plasticizing vinyl chloride-acrylonitrile copolymers.

My new compounds impart excellent flexibility characteristics to resin compositions, and, more particularly, the use of my new compounds with vinyl chloride-acrylonitrile resin compositions makes possible additional uses of vinyl chloride-acrylonitrile plasticized compositions in the fields of cloth coatings, paper coatings, metal coatings, wire coatings, calendered sheets and molded articles where low-temperature flexibility is an important feature.

The new compounds may be synthesized by reacting the cyclic anhydride of a dibasic acid with di(2-cyanoethyl) amine and then esterifying the resulting N,N-bis(2-cyanoethyl) carboxamic acid with an alcohol. The starting material, di(2-cyanoethyl) amine, may be readily prepared by the reaction of acrylonitrile with ammonia.

The reaction of di(2-cyanoethyl) amine with the cyclic anhydride of the dicarboxylic acid gives the corresponding N,N-bis(2-cyanoethyl) carboxamic acid in excellent yield. Esterification of these amic acids with alcohols produces the esters of the N,N-bis(2-cyanoethyl) carboxamic acids.

The reaction whereby the N,N-bis(2-cyanoethyl) carboxamic acid esters are produced in accordance with my invention may be written as follows:

(a) 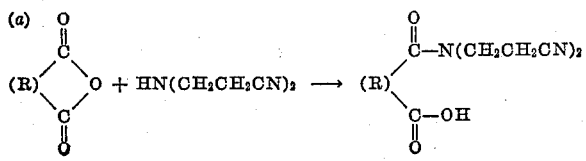

(b) 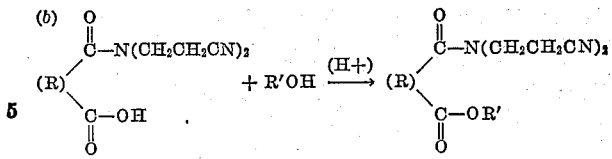

wherein R represents a divalent aliphatic hydrocarbon radical and R' represents a hydrocarbon radical corresponding to the alcohol used in the esterification reaction.

The acids of the type above defined do not appear in the prior art and are therefore new compounds forming a part of this invention.

In general, these acids may be prepared by adding di(2-cyanoethyl) amine slowly to a slurry of the cyclic anhydride in benzene at a temperature in the range of 50° C. to 80° C. The mixture is then stirred at the reflux temperature for a short period of time. Upon cooling, the N,N-bis(2-cyanoethyl) carboxamic acids are crystallized from the solution.

The N,N-bis(2-cyanoethyl) carboxamic acids are colorless crystalline solids, soluble to a limited amount in water and alcohols, quite insoluble in hydrocarbons and were unstable at moderately high temperatures.

The esters of the N,N-bis(2-cyanoethyl) carboxamic acids can be prepared by esterification of the isolated and purified amic acid or by direct esterification of the crude amic acid. The water formed during the esterification reaction can be removed by azeotropic distillation, or other known expedients. The esters are usually taken as residue products after steam-stripping to remove the volatile by-products.

The cyclic anhydrides employed in the preparation of the N,N-bis(2-cyanoethyl) carboxamic acids can be any aliphatic dicarboxylic acid anhydride. The anhydrides include, for example, succinic anhydride, glutaric anhydride and adipic anhydride. The anhydrides employed in the preparation of the amic acids also include the anhydrides of the unsaturated dicarboxylic acids, such as, for example, maelic anhydride.

The alcohols employed in the esterification reaction may be any of the typical monohydric and polyhydric alcohols, including both aliphatic and aromatic alcohols, such as, for example, methanol, ethanol, isopropanol, butanol, 2-ethylbutanol, 2-ethylhexanol, allyl alcohol, furfuryl alcohol, tetrahydrofurfuryl alcohol, benzyl alcohol, and diethylene glycol.

In its broadest aspects, my invention is directed to the esters of N,N-bis(2-cyanoethyl) carboxamic acids having the general formula:

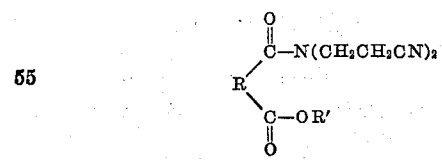

wherein R represents a divalent, aliphatic hydrocarbon radical and R' represents an aliphatic hydrocarbon radical.

More specifically, my invention is directed to the esters of N,N-bis(2-cyanoethyl) carboxamic acids having the general formula:

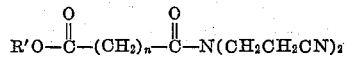

wherein R' represents an aliphatic hydrocarbon radical and "n" represents an integer in the range 2 through 4.

In its specific aspects, my invention is directed to the esters of N,N-bis(2-cyanoethyl) carboxamic acids having the general formula:

$$R'O-\overset{O}{\underset{\|}{C}}-(CH_2)_n-\overset{O}{\underset{\|}{C}}-N(CH_2CH_2CN)_2$$

wherein R' represents an aliphatic hydrocarbon radical containing from 1 to 8 carbon atoms and "n" represents a whole integer in the range 2 through 4.

The following examples will serve to illustrate the practice of the invention, including the preparation of both the amic acids and their esters:

EXAMPLE 1

*N,N-bis(2-cyanoethyl) succinamic acid*

A mixture of succinic anhydride (5 mols) and benzene was refluxed and B,B'-iminodipropionitrile (di-(cyanoethyl)-amine) (5 mols) was slowly added. The mixture was heated for one hour and then allowed to cool and crystallize. The solid product was removed and crystallized from ethanol. The N,N-bis(2-cyanoethyl) succinamic acid was obtained in 92.6 percent yield as colorless crystals melting at 118°–119° C. The product contained 18.73 percent N, which corresponds to the theoretical value of 18.83 percent N, determined from the theoretical chemical analysis of the product.

EXAMPLE 2

*N,N-bis(2-cyanoethyl) maleamic acid*

To a mixture of maleic anhydride (1 mol) in benzene at the reflux, B,B'-iminodipropionitrile (1 mol) was added slowly while stirring. After heating one hour, the mixture was allowed to cool and crystallize. The solid product was then crystallized from ethanol. The N,N-bis(2-cyanoethyl) maleamic acid was obtained in 91 percent yield as colorless crystals melting at 140°–141° C. The product contained 18.91 percent N, which compares favorably with the theoretical value of 19.0 percent N determined from the theoretical chemical analysis.

Esterification of this type of carboxylic acid is considerably more difficult than would be expected. In fact the N,N-bis(2-cyanoethyl) maleamic acid was totally resistant to normal esterification. This extreme lack of reactivity is attributed to steric hindrance caused by the cyanoethyl groups held in a fixed cis configuration to the carboxy group under attack. Fisher-Hirschfelder molecular models clearly demonstrate this shielding effect. A further fact strengthening this view is that when dry hydrochloric acid is used as a catalyst (see Example 13) the maleamic acid was esterified. The hydrochloric acid first catalyzed the isomerization of the cis-maleic form to the trans-fumaric form, which could then be esterified with no steric hindrance.

EXAMPLE 3

*N,N-bis(2-cyanoethyl) glutaramic acid*

A mixture of glutaric anhydride (1 mol) and dioxane was warmed to 50° C. and B,B'-iminodipropionitrile (1 mol) was added during stirring. The mixture was reacted for three hours, then allowed to cool and crystallize. The precipitated amic acid was removed and crystallized from water. The N,N-bis(2-cyanoethyl) glutaramic acid was obtained as colorless crystals melting at 85°–88° C. in 69.6 percent yield. The product contained 56.02 percent C and 6.13 percent H, which correspond closely with the theoretical chemical analysis value of 55.67 percent C and 6.38 percent H.

EXAMPLE 4

*N,N-bis(2-cyanoethyl)-9-fluorenylsuccinamic acid*

An equimolar quantity of B,B'-iminodipropionitrile was reacted for one hour at 50° C. in benzene solution with 9-fluorenylsuccinic anhydride having the formula:

On cooling, the amic acid crystallized and was removed and recrystallized from aqueous ethanol. An 83 percent yield of N,N-bis(2-cyanoethyl)-9-fluorenylsuccinamic acid was obtained as colorless crystals melting at 140°–141° C.

EXAMPLE 5

*Methyl N,N-bis(2-cyanoethyl) succinamate*

A mixture of N,N-bis(2-cyanoethyl) succinamic acid (1 mol), methanol (3 mols), sulfuric acid (3 grams) and 300 ml. of ethylene chloride was refluxed for 21 hours. The layers were separated and the ethylene chloride portion was washed with sodium carbonate solution and the solvent removed. Methyl N,N-bis(2-cyanoethyl) succinamate was obtained in 60 percent yield as a residue product. The product contained 17.37 percent N, which corresponds closely to the theoretical chemical analysis value of 17.72 percent N and had a refractive index ($n_D^{30}$) of 1.4832.

EXAMPLE 6

*Ethyl N,N-bis(2-cyanoethyl) succinamate*

A mixture of N,N-bis(2-cyanoethyl) succinamic acid (0.5 mol), ethanol (1.1 mol), sulfuric acid (1 gram) and 250 ml. of benzene were refluxed for 8 hours, the water formed being removed azeotropically. After washing the reaction mixture with sodium carbonate, the solvent was removed. Ethyl N,N-bis(2-cyanoethyl) succinamate was obtained in 81 percent yield as a residue product. The product contained 16.68 percent N, as compared with the theoretical value of 16.73 percent N and had a refractive index ($n_D^{30}$) of 1.4788.

EXAMPLE 7

*Isopropyl N,N-bis(2-cyanoethyl) succinamate*

A mixture of N,N-bis(2-cyanoethyl) succinamic acid (0.5 mol), isopropanol (0.5 mol), sulfuric acid (1 gram) and 300 ml. of benzene were refluxed for 16 hours while the water formed was removed azeotropically. The reaction mixture was washed with sodium carbonate solution and the solvent was removed. Isopropyl N,N-bis(2-cyanoethyl succinamate was obtained in 55 perecent yield as a viscous amber oil, which crystallized on long standing to a solid melting at 45°–47° C. The product contained 15.23 percent N, as compared with the theoretical value of 15.86 percent N, and had a refractive index ($n_D^{30}$) of 1.4747.

EXAMPLE 8

*Butyl N,N-bis(2-cyanoethyl) succinamate*

B,B'-iminodipropionitrile (2 mols) was added slowly to a stirred suspension of succinic anhydride (2.1 mols) in refluxing benzene and the mixture reacted for one hour. Butanol (3 mols) and sulfuric acid (1 gram) were added and the mixture refluxed for 8 hours, while removing the water formed azeotropically. The reaction mixture was extracted with sodium carbonate solution and the solvent removed. Butyl N,N-bis(2-cyanoethyl) succinamate was obtained in 92 percent yield as a viscous amber colored residue product. The product contained 60.15 percent C; 7.65 percent H; and 15.38 percent N, as compared to the theoretical chemical analysis of 60.18 percent C;

7.59 percent H; and 15.05 percent N, and had a refractive index of 1.4767.

EXAMPLE 9

*2-ethylbutyl N,N-bis(2-cyanoethyl) succinamate*

A mixture of N,N-bis(2-cyanoethyl) succinamic acid (0.5 mol), 2-ethylbutanol (0.5 mol), sulfuric acid (5 grams) and 300 ml. of benzene was refluxed for 14 hours, while removing the water formed azeotropically. The reaction mixture was washed wth sodium carbonate solution and the solvent removed. 2-ethylbutyl N,N-bis(2-cyanoethyl) succinamate was obtained in 99 percent yield as a dark colored viscous residue product. The product contained 13.27 percent N, which corresponds to the theoretical value of 13.67 percent N and had a refractive index ($n_D^{30}$) of 1.4763.

EXAMPLE 10

*2-ethylhexyl N,N-bis(2-cyanoethyl) succinamate*

A mixture of N,N-bis(2-cyanoethyl) succinamic acid (0.5 mol), 2-ethylhexanol (0.55 mol), sulfuric acid (1 gram) and 250 ml. of benzene was refluxed for 12 hours, while removing the water formed azeotropically. The reaction mixture was washed with sodium carbonate solution and the solvent removed. 2-ethylhexyl N,N-bis(2-cyanoethyl) succinamate was obtained in 70 percent yield as a dark colored residue product. The product contained 12.38 percent N as compared with the theoretical value of 12.54 percent N, and had a refractive index ($n_D^{30}$) of 1.4736.

EXAMPLE 11

*Allyl N,N-bis(2-cyanoethyl) succinamate*

B,B'-iminodipropionitrile (3 mols) was added slowly to a stirred suspension of succinic anhydride (3 mols) in refluxing benzene and the mixture reacted for 2 hours. Allyl alcohol (6 mols) and sulfuric acid (1 gram) were added and the mixture refluxed for 13 hours, while the water formed was removed azeotropically. The reaction mixture was washed with sodium carbonate solution and the solvent removed. Allyl N,N-bis(2-cyanoethyl) succinamate was obtained in 60 percent yield as a viscous amber colored residue product. The product contained 15.5 precent N, which corresponds to the theoretical value of 15.9 percent N, and had a refractive index ($n_D^{30}$) of 1.4893.

EXAMPLE 12

*Diethyleneglycol N,N-bis(2-cyanoethyl) succinamate*

A mixture of N,N-bis(2-cyanoethyl) succinamic acid (1.1 mol), diethyleneglycol (0.5 mol), benzene (750 ml.) and sulfuric acid (4 grams) was refluxed for 16 hours, while removing the water formed azeotropically. The reaction mixture was washed with sodium carbonate solution and the solvent removed. Diethyleneglycol di-N,N-bis(2-cyanoethyl) succinamate was obtained in 25 percent yield as a very viscous amber residue product. The product contained 55.40 percent C; 6.22 percent H; and 15.81 percent N, which corresponds to the theoretical chemical analysis of 55.79 percent C; 6.20 percent H; and 16.27 percent N.

EXAMPLE 13

*Ethyl N,N-bis(2-cyanoethyl) fumaramate*

B,B'-iminodipropionitrile (2 mols) was added slowly to a stirred suspension of maleic anhydride (2 mols) in refluxing benzene and the mixture reacted for 2 hours. Ethanol (4 mols) was added and the mixture refluxed for 11 hours, while sparging dry hydrogen chloride beneath the surface and removing the water formed azeotropically. The reaction mixture was filtered and washed with sodium carbonate solution and then concentrated. On standing, the residual oil crystallized. Recrystallization from aqueous ethanol gave ethyl N,N-bis(2-cyanoethyl) fumaramate in 26 percent yield as colorless crystals melting at 68°–69° C. The product contained 57.87 percent C and 5.98 percent H, which corresponds to the theoretical values of 57.81 percent C and 6.02 percent H.

EXAMPLE 14

*Butyl N,N-bis(2-cyanoethyl) glutaramate*

A mixture of N,N-bis(2-cyanoethyl) glutaramic acid (0.4 mol), butanol (0.8 mol), benzene (300 ml.) and p-toluene-sulfonic acid (0.4 gram) was refluxed for 9 hours, while removing the water formed azeotropically. The reaction mixture was washed with sodium carbonate solution and the solvent removed. Butyl N,N-bis(2-cyanoethyl) glutaramate was obtained in 99 percent yield as a viscous dark colored residue product. The product contained 62.47 percent C; 7.71 percent H; and 14.29 percent N, which corresponds to the theoretical values of 62.92 percent C; and 7.61 percent H, and had a refractive index ($n_D^{30}$) of 1.4700.

This application is a division of application, Serial No. 350,514, filed April 22, 1953, now Patent No. 2,790,820.

What is claimed is:

Ethyl N,N-bis(2-cyanoethyl) succinamate.

No references cited.